(12) United States Patent
Morita et al.

(10) Patent No.: US 6,468,020 B1
(45) Date of Patent: Oct. 22, 2002

(54) APPARATUS FOR TRANSFERRING A MOVABLE BODY

(75) Inventors: Yuji Morita; Kenjiro Oizumi; Katsuhiro Onodera; Hideo Ito; Masamitsu Ohkawara; Masashi Kurosawa, all of Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 129 days.

(21) Appl. No.: 09/631,966

(22) Filed: Aug. 3, 2000

(30) Foreign Application Priority Data

Aug. 6, 1999 (JP) .......................... 11-224297

(51) Int. Cl.[7] .............................. G11B 17/04
(52) U.S. Cl. .............................. 414/416.03; 360/99.06; 414/331.01
(58) Field of Search ............... 414/331.01, 416.03; 360/99.06; 369/77.02

(56) References Cited

U.S. PATENT DOCUMENTS

| 4,168,595 A | * | 9/1979 | Pickles et al. | ................ 49/352 |
| 4,412,260 A | * | 10/1983 | Stricklin et al. | ............... 360/97 |
| 4,685,248 A | | 8/1987 | Hammond | |
| 4,777,631 A | * | 10/1988 | Kamoshita et al. | ........ 369/77.2 |
| 5,251,892 A | * | 10/1993 | No et al. | ..................... 271/184 |
| 6,172,846 B1 | * | 1/2001 | Ariyoshi | .................. 360/99.06 |

FOREIGN PATENT DOCUMENTS

| DE | 2739127 | * 10/1978 |
| EP | 0 747 899 A2 | 12/1996 |
| WO | WO 98/21438 | 5/1998 |

* cited by examiner

Primary Examiner—Steven A. Bratlie
(74) Attorney, Agent, or Firm—Nixon & Vanderhye

(57) ABSTRACT

An apparatus for transferring a movable body comprises a rack having flexibility, a pinion for driving the rack and a guide device for guiding the rack. The guide device has a curved portion. The pinion may locate along the curved portion of the guide device. The movable body comprises a disc.

12 Claims, 15 Drawing Sheets

APPARATUS FOR TRANSFERRING A MOVABLE BODY

BACKGROUND OF THE INVENTION

1. Field of the Invention

The present invention relates to an apparatus for transferring a movable body, and especially to an apparatus for loading a magnet-optical disc, an optical disc or the like into the inside of a disc player.

2. Description of the Related Art

With respect to a disc transfer apparatus for loading a cartridge such as a mini disc (MD) into the inside of a disc player, there have conventionally been known the rack-and-pinion type as shown in FIG. 15 and the lever type as shown in FIG. 16.

In the rack-and-pinion type, the power of a motor serving as the power source is transmitted to a pinion 101 through a reduction mechanism comprising a gear train. The pinion 101 drives a rack 102 so as to transfer a disc 103, which is connected to the rack 102.

In the lever type, a lever 104 is provided above a disc 103 so as to be swingable. The lever 104 is driven by a motor through a reduction mechanism comprising a gear train so as to transfer the disc 103, which is connected to front end of the lever 104.

The conventional rack-and-pinion type does not need any space for mechanical elements above the disc 103, thus permitting to reduce the height of a disc player. However, there is required a long distance L, which is identical with or more than twice as large as a stroke for transferring the disc 103. The conventional lever type permits to reduce the distance L. However, the installation of the lever 104 requires a space having a sector-shape above the disc 103, thus making it impossible to reduce the height of the disc player.

SUMMARY OF THE INVENTION

An object of the present invention is therefore to provide an apparatus for transferring a movable body, which has advantages of the rack-and-pinion type as well as the lever type, and more specifically, enables reduction, not only the height of a player, but also its depth.

In order to attain the aforementioned object, the rack-and-pinion type is applied to the apparatus of the present invention and a passage along which the driven rack moves is provided in its middle with a curved portion. More specifically, the apparatus for transferring a movable body comprises a rack having flexibility; a pinion for driving said rack; and a guide device for guiding said rack in movement thereof, said guide device having a curved portion.

Application of the rack-and-pinion type to the apparatus for transferring the movable body enables a reduction of the height of the player. The guide device for guiding the rack in its movement has the curved portion. As a result, the rack can curve in the passage for it in the middle, thus enabling a reduction in the depth of the player. The guide device may include a guide groove into which the rack is fitted, a guide shaft that pass through the rack and a guide rail.

The pinion may locate along the curved portion of the guide device. The pinion has conventionally been compelled to locate along the linear portion of the rack. According to the present invention, it is however possible to locate the pinion along the curved portion of the guide device, thus enabling improved degree of freedom in the placement of the pinion. When the passage for the rack is provided with the curved portion having a curve angle of about 90 degrees so that the passage is converted into an L-shape, placement of the pinion along the curved portion can avoid the existence of useless space and make the transfer apparatus small.

The rack may have a tooth shape having a smaller profile than a normal profile, which is adapted to the pinion. The normal profile means the involute tooth profile in case of the pinion having the involute tooth profile, on the one hand, and the cycloid tooth profile in case of the pinion having the cycloid tooth profile, on the other hand. According to such a structural feature, improper engagement of the pinion with the rack can be prevented when the pinion locates along the curved portion of the rack.

The rack may have engagement portions with the pinion, each of which has a triangular shape in a plan. According to such a structural feature, it is possible to manufacture easily the rack.

The guide device may comprise a guide groove, into which the rack is fitted, and at least part of the rack, which is received in the guide groove, may have a tooth profile that is formed into a block-shape so as to be guided smoothly in the guide groove. According to such a structural feature, the contact area of the tooth of the rack, which has the block-shape, with the wall surface of the guide groove becomes larger, thus permitting to guide the rack in a stable manner.

The guide groove may have a larger-width portion, which is larger than a height of the rack, and a smaller-width portion, which is smaller than the larger-width portion so as to ensure a proper engagement of the rack with the pinion. According to such a structural feature, the smaller width portion of the guide groove ensures a proper engagement of the rack with the pinion, on the one hand, and in the remaining portion other than the smaller width portion, i.e., the larger-width portion, the sufficient clearance between the guide groove and the rack causes the rack to move relative to the pinion, on the other hand. Accordingly, the proper drive of the rack can be ensured and the proper engagement of the rack with the pinion can also provided without subjecting the rack to a finishing treatment in its tooth profile in high accuracy.

The rack may locate so as to escape from a head of a player for the movable body in a plan. According to such a structural feature, it is possible to prevent interference of the rack with the head of the player, thus permitting to make the player in a smaller size. For example, when the mini disc (MD) is transferred, a magnetic writing head locates above the mini disc. The magnetic head moves in a perpendicular direction to a plan along which the mini disc is transferred. Placement of the rack to escape from the magnetic head in the plan reduces the height of the player.

The movable body may comprise a disc.

In order to attain the aforementioned object, an apparatus of the present invention for transferring a movable body, comprises a transfer lever for engaging with said recess portion to transfer said movable body, said transfer lever having a portion to be guided; and a guide device for guiding said portion to be guided of said transfer lever, said guide device being provided with a restriction member, in which movement of said portion to be guided is restricted unless said transfer lever moves by a prescribed amount of movement in a non-transferring state, and said prescribed amount of movement being determined to be smaller than an amount of movement required to cause said transfer lever to engage with said recess portion in the non-transferring state. According to the present invention, the depth of the recess portion of the movable body such as a disc, into which the transfer lever is to be fitted when the movable body is inserted into a receiving unit in an upside-down improper manner, is not identical with the depth of a recess portion of the movable body, into which the transfer lever is to be fitted when the movable body is inserted into the receiving unit in a proper manner. As a result, the transfer lever does not move so that an amount of its movement does not exceed the prescribed value in the former case. In this case, the movement of the portion to be guided is restricted by the restriction member of the guide device so that the movable body cannot be transferred. When the movable body is inserted into the receiving unit in the proper manner, the transfer lever moves so that an amount of its movement exceeds the prescribed value. As a result, the movement of the portion to be guided is not restricted by the restriction member of the guide device so that the movable body can be transferred.

DETAILED DESCRIPTION OF THE PREFERRED EMBODIMENTS

Now, embodiments of an apparatus of the present invention for transferring a movable body will be described in detail below with reference to the accompanying drawings. In the embodiments, the present invention is applied to a disc transfer apparatus.

Figure 1:
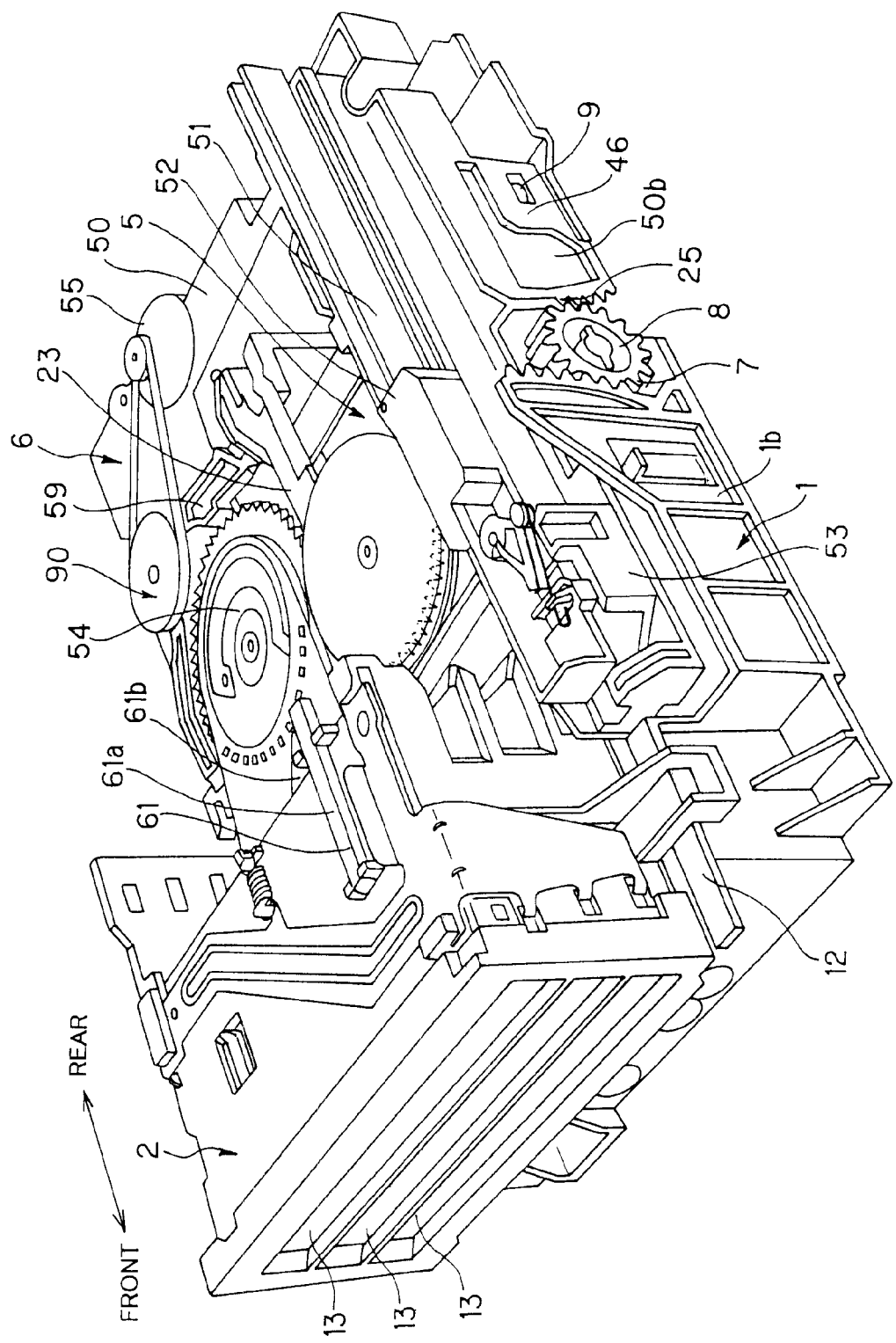
FIG. 1 is a perspective view illustrating a disc changer into which an apparatus of the first embodiment of the present invention for transferring a movable body is incorporated.
Figure 2:
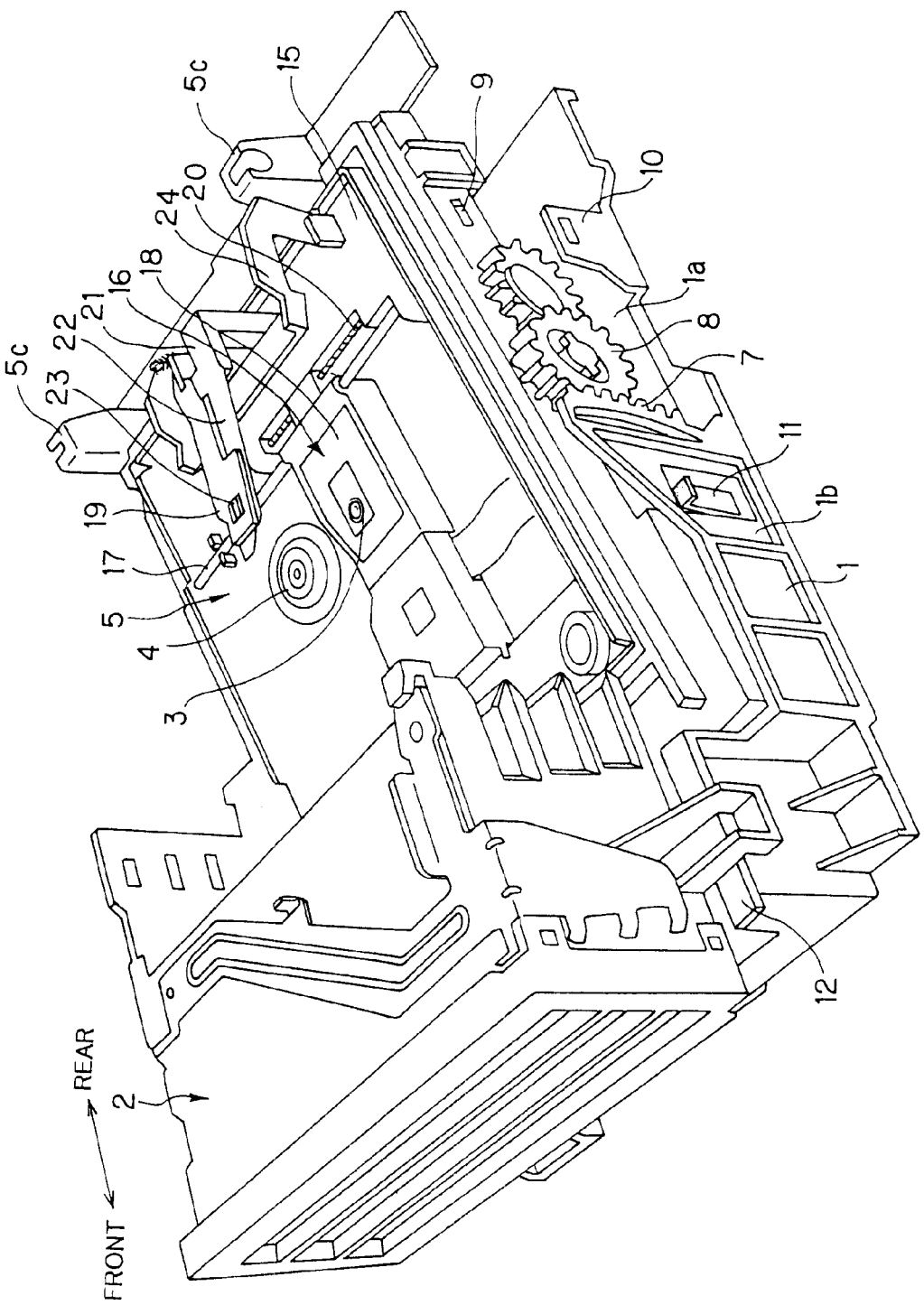
FIG. 2 is a perspective view illustrating the state in which a transfer unit is removed from the disc changer as shown in FIG. 1.

FIGS. 1 and 2 are perspective views illustrating a disc changer into which the disc transfer apparatus 90 of the embodiment of the present invention is incorporated. The disc changer is used as a changer for mini discs (MD) (hereinafter simply referred to as the "discs"), each of which has a cartridge into which the disc is received. The disc changer comprises a base unit 1, a receiving unit 2 for receiving a plurality of discs, for example, three discs, a playback unit 5 for reproducing information of the disc and a transfer unit 6 for transferring the disc received in the receiving unit 2 to the playback unit 5. The transfer unit 6 moves up and down to reach the prescribed position for the disc. Then, the disc transfer apparatus 90 draws the disc into the playback unit. FIG. 1 is a perspective view illustrating the disc changer into which the base unit 1, the playback unit 5, the receiving unit 2 and the transfer unit 6 are assembled. FIG. 2 illustrates the state in which the transfer unit 6 is removed from the assembled units to show the playback unit 5 locating below the transfer unit 6.

Figure 12:
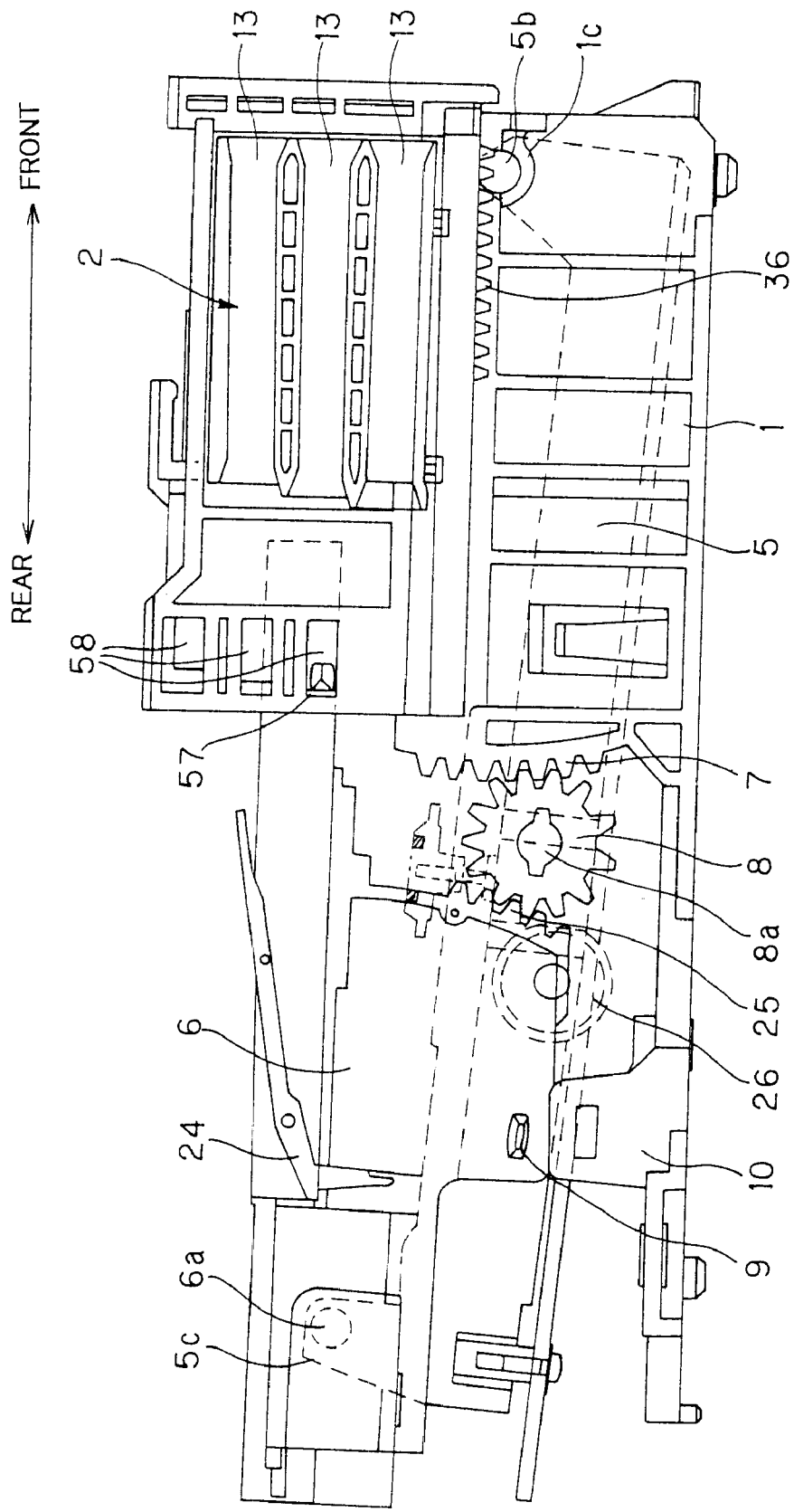
FIG. 12 is a side view of the disc changer as shown in FIG. 1.

As shown in FIG. 2, the base unit 1 has a bottom plate 1*a* having a rectangular shape and side walls 1*b* provided on the opposite side edges of the bottom plate 1*a*. Each of the side walls 1*b* extends from the front edge of the base unit 1 to its middle portion. The side wall 1*b* is provided at its front end with a bearing 1*c* for supporting the rotation shaft 5*b* of the playback unit 5 (see FIG. 12) so that the playback unit 5 can swing around he rotation shaft 5*b*. The side wall 1*b* has a gear-segment portion 7 formed at the rear end of the side wall 1*b*. The gear-segment portion 7 engages with a gear 8 provided on the playback unit 5. The central axis of the gear-segment portion 7 coincides with the central axis of the rotation shaft 5*b* of the playback unit 5 so that the playback unit 5 can swing while maintaining the engagement of the gear 8 with the gear-segment portion 7.

The receiving unit 2 is placed on the side walls 1*b* of the base unit 1 so as to be slidable in the longitudinal direction of the disc changer. Each of the side walls has a guide rail 12 that extends in the longitudinal direction of the disc changer to guide the receiving unit 2.

The base unit 1 has wedge-receiving walls 10 formed on the opposite edges of the rear of the base unit 1. Each of the wedge-receiving walls 10 has a hole that has a corresponding shape to a wedge portion 9 projecting from the playback unit 5. The wedge portion 9 is fitted into the hole of the wedge-receiving wall 10.

The receiving unit 2 has three slots 13 so that three discs can be stored in a stacking state in the vertical direction. Each of the slots 13 is provided with a retaining member having a leaf-spring shape for retaining the disc. When the disc is inserted into the slot 13 to reach a prescribed position, the retaining member is fitted into a hole formed on a shutter that is provided on the side of the disc, so as to retain the disc in the prescribed position. The receiving unit 2 is provided with a positional restriction lever 61 for preventing the disc from being inserted to move beyond the prescribed position. The positional restriction lever 61 is composed of a rotatable shaft 61*a* that is rotatably supported on the upper surface of the receiving unit 2 and a restriction bar 61*b* extending from the rotatable shaft 61*a* so as to intersect the slot 13 at its rear end. The positional restriction lever 61 can swing along with the upward or downward movement of the transfer unit 6 so as to ensure a space in which the disc can be pulled from the receiving unit 2 into the transfer unit 6.

The transfer unit 6 for drawing the disc from the receiving unit 2 is obtained by providing a load base 50 with the disc transfer apparatus 90 for transferring the disc as shown in FIG. 1. The load base 50 is provided at its rear end with a rotation shaft 6a that is supported by a bearing 5c of the playback unit 5 (see FIG. 9) so that the transfer unit 6 can swing relative to the playback unit 5. The load base 50 is also provided at the opposite side edges with the side walls 50b. The side wall 50b has a transfer-unit gear 25, which engages with the gear 8 provided on the playback unit 5. The transfer-unit gear 25 is formed as the gear-segment portion having the central axis that coincides with the central axis of the rotation shaft 6a. The gear 8 provided on the playback unit 5 is held between the transfer-unit gear 25 and the gear-segment portion 7 of the base unit 1 (i.e., the base-unit gear 7). The side wall 50b also has a hole into which the wedge portion 9 is fitted. The load base 50 has guide rails for guiding the drawn disc.

Figure 3:
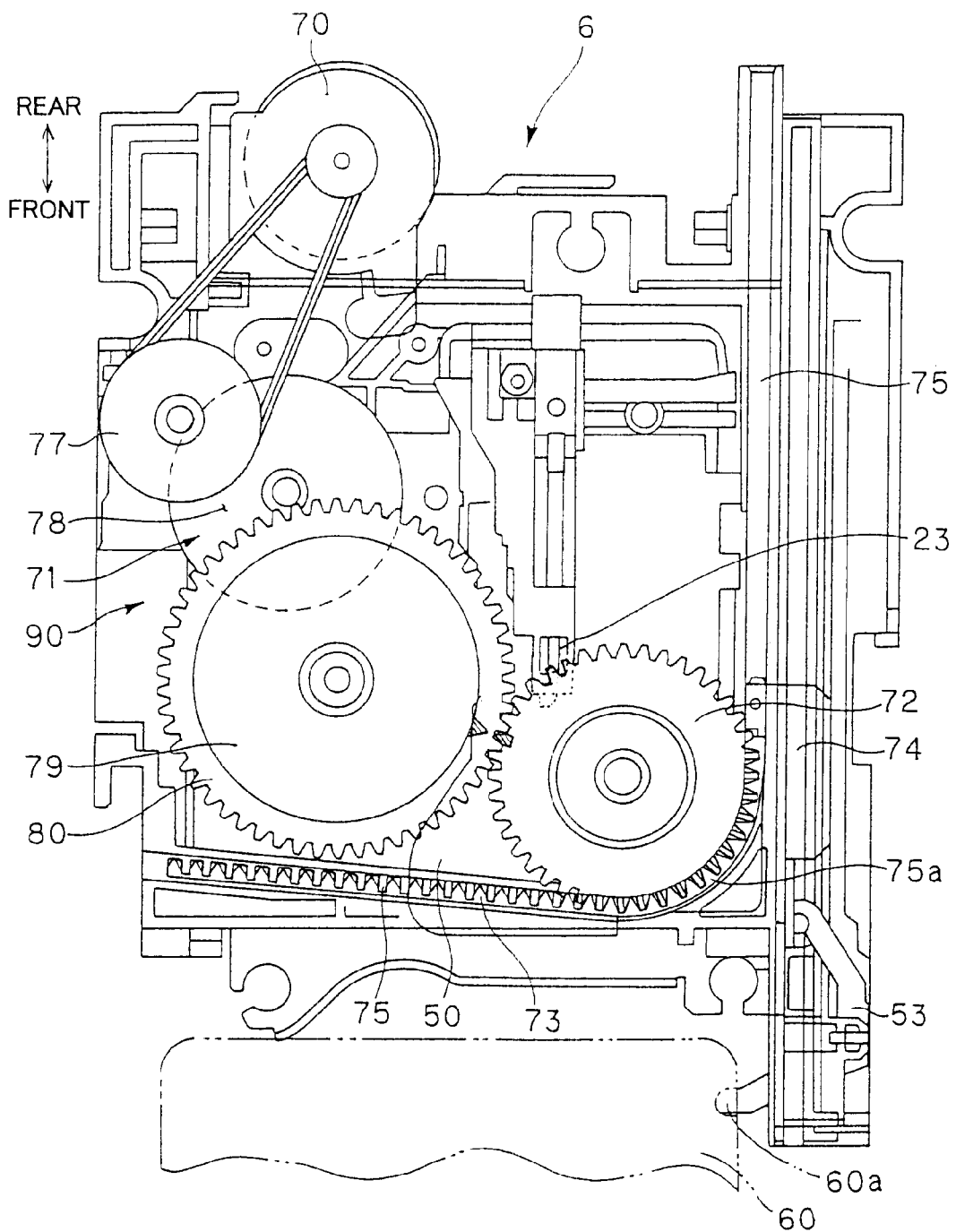
FIG. 3 is a plan view illustrating the transfer apparatus in a state in which a disc has not as yet been transferred.
Figure 4:
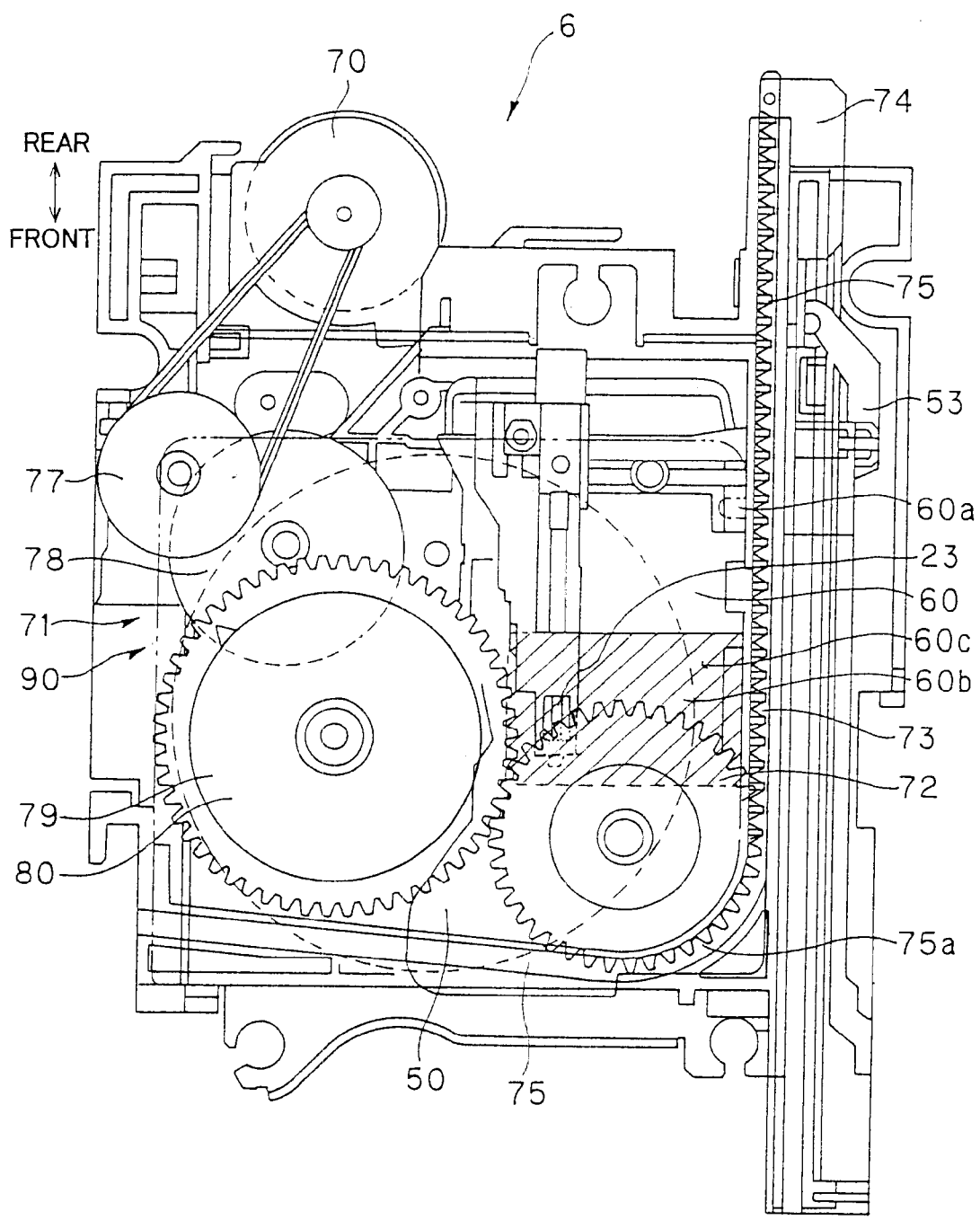
FIG. 4 is a plan view illustrating the transfer apparatus in a state in which the disc has already been transferred.

FIGS. 3 and 4 are plan views illustrating the transfer unit 6. FIG. 3 illustrates the transfer unit 6 in a state in which the disc has not as yet been transferred. FIG. 4 illustrates the transfer unit 6 in a state in which the disc has already been transferred. The disc transfer apparatus 90 includes a transfer unit-driving motor 70, a gear train 71 for transmitting the power of the transfer unit-driving motor 70 in a reduced speed, a flexible rack 73 engaging with the last pinion 72 of the gear train 71, a transfer plate 74 connected to the flexible rack 73 and a transfer lever 53 pivotably connected to the transfer plate 74. The flexible rack 73 is fitted into a guide groove 75 formed on the load base 50. Drive of the transfer unit-driving motor 70 causes the rotational power of the motor 70 to be transmitted to the pinion 72 in a reduced speed so that the pinion 72 drives the flexible rack 73. When the flexible rack 73 slides along the guide groove 75, the transfer plate 74 slides together with the flexible rack 73. As a result, the transfer lever 53 swings to fit into a fitting hole 60a of the disc 60 to transfer the disc 60 to a prescribed position in the inside of the changer.

The guide groove 75 has the arcuate curved portion 75a so that the guide groove 75 itself is formed into an L-shape. The curved portion 75a has substantial the same radius of curvature as the outside diameter of the pinion 72. The pinion 72 locates along the curved portion 75a. Such a location of the pinion along the curved portion 75a avoids the existence of useless space between the pinion 72 and the curved portion 75a so as to make the transfer apparatus small. The pinion 72 has an arc, which is identical with a quarter of the periphery of the pinion and locates along the curved portion 75a.

Figure 5:
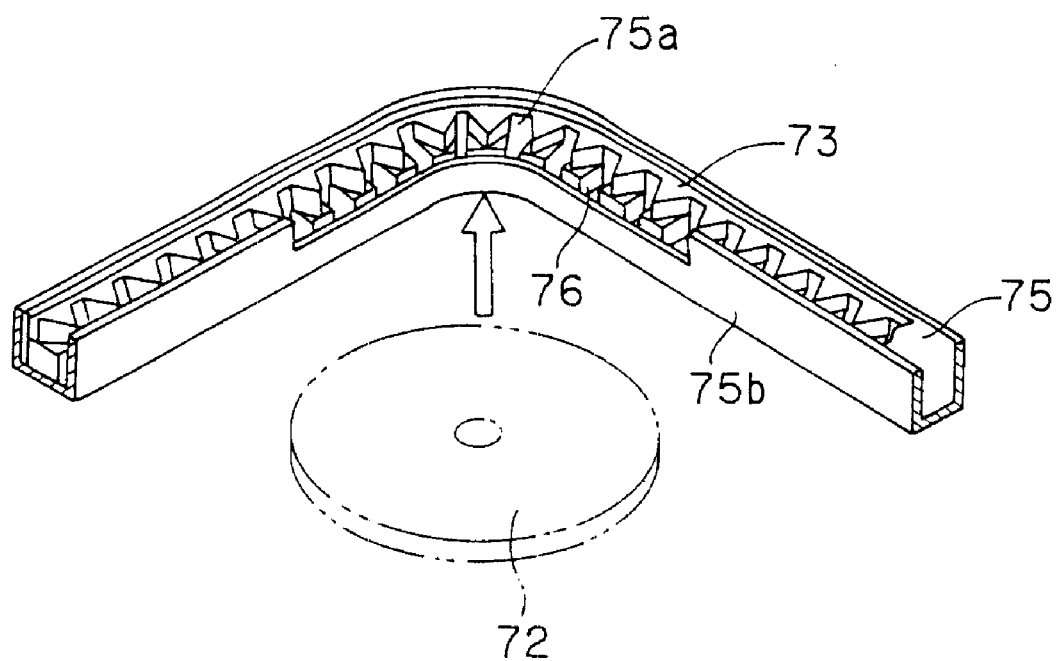
FIG. 5 is a perspective view illustrating a curved portion of a guide groove serving as a guide device.

FIG. 5 illustrates the curved portion 75a of the guide groove 75 and the pinion 72 locating along the curved portion 75a. The curved portion 75a is provided with a guide wall 75a locating in the inner peripheral side. The guide wall 75a has a cut-out 76 from which the teeth of the flexible rack are exposed. The pinion 72 engages with the teeth of the flexible rack 73, which are exposed from the cut-out 76.

Figure 6:
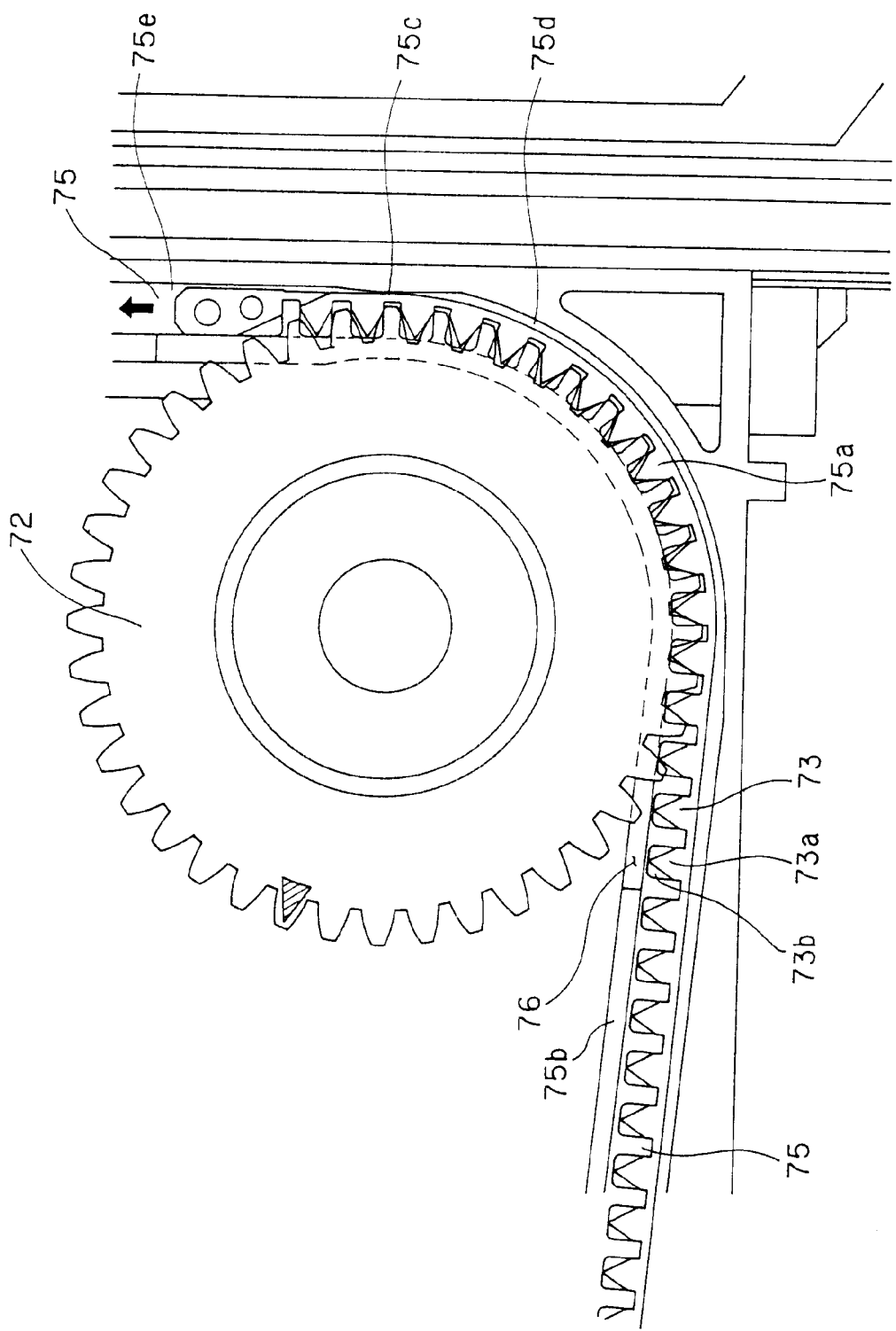
FIG. 6 is an enlarged plan view illustrating a flexible rack and a pinion.

FIG. 6 is an enlarged plan view illustrating the pinion 72 and the flexible rack 73, which locates in the guide groove 75. The flexible rack 73 is formed of synthetic resin and has flexibility so as to bend freely. The flexible rack 73 is provided with the teeth, each of which has the upper portion 73a and the lower portion 73b. The upper portion 73a has a triangular shape so as to engage with the pinion 72. The lower portion 73b has a block-shape so as to be received in the guide groove 75. When the pinion 72 locates along the curved portion 75a in the manner as mentioned above, the pinion 72 pulls the flexible rack 73 so as to drive it. The tooth of the pinion has the involute tooth profile so as to engage with the gear train 71. Use of a flexible rack having the involute tooth profile, which is adapted to the pinion 72, causes an improper engagement, resulting in an impracticable drive of the rack. On the contrary, use of the flexible rack 73 provided with the tooth having the triangular shape so as to provide the smaller profile than the normal profile, which is adapted to the pinion 72, does not cause any improper engagement when the rack is pulled by the pinion 72. When the tooth of a flexible rack has the triangular shape also in its lower portion, any stable guidance of the flexible rack in the guide groove 75 cannot be provided. When the lower portion 73b of the tooth of the flexible rack 73 has the block-shape, the contact area of the lower portion 73b of the flexible rack 73 with the guide wall 75b becomes larger so as to provide a stable guidance of the flexible rack 73.

The guide groove 75 has a narrowed portion in the vicinity of the terminal point 75c of the engagement zone of the flexible rack 73 with the pinion 72. Such a narrowed portion of the guide groove 75 ensures a proper engagement of the flexible rack 73 with the pinion 72, resulting in transmission of the driving power of the pinion 72 to the flexible rack 73 in a proper manner. The remaining portion 75d of the guide groove 75, which has an arc locating behind the terminal point 75c, has a larger width than the narrowed portion 75c to provide a larger-width portion 75d. Such a structure ensures a relatively large clearance between the flexible rack 73 and the wall of the guide groove 75d so that the flexible rack 73 is kept in a loose state. More specifically, the flexible rack 73 can move relative to the pinion 72 within the range of the above-mentioned clearance. Accordingly, the proper drive of the rack can be ensured and the proper engagement of the rack with the pinion can also provided without subjecting the rack to a finishing treatment in its tooth profile in high accuracy. Incidentally, a linear passage 75e locating ahead of the terminal point 75c has a proper clearance so as not to cause the flexible rack 73 to move in a zigzag direction.

As shown in FIGS. 3 and 4, a write magnetic head 23 locates above the drawn disc 60. The shutter 60c of the drawn disc 60 is opened and a disc body 60d received in the cartridge is exposed. The magnetic head 23 can be moved substantially above the exposed disc body 60d by means of a cam device described later in a direction perpendicular to a plane along which the disc 60 is transferred. The flexible rack locates so as to escape from the magnetic head 23. It is therefore possible to make the changer in a smaller size.

Figure 7:
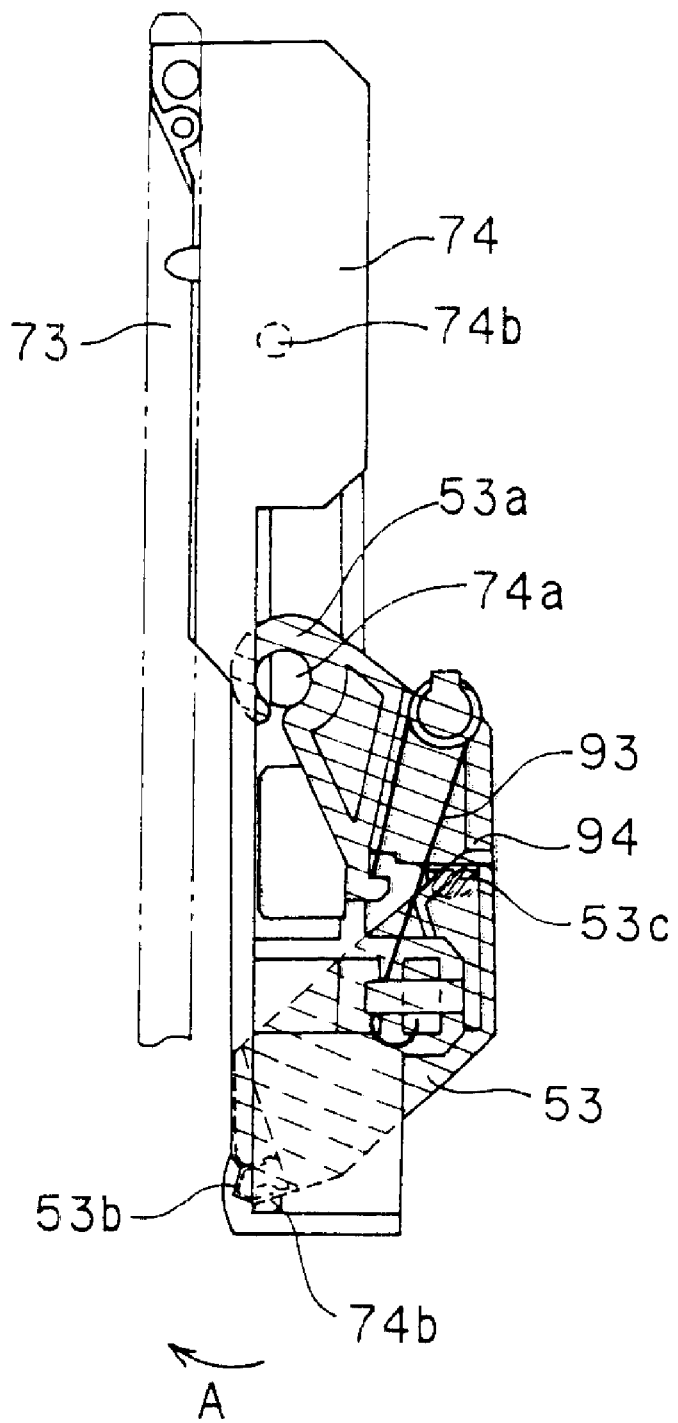
FIG. 7 is a plan view illustrating the transfer unit and a transfer lever.

FIG. 7 illustrates the transfer plate 74 and the transfer lever 53. The transfer plate 74 has a rectangular shape and is fixed to the flexible rack 73 by means of the conventional fixing means such as a screw. The transfer plate 74 is provided in the center of its upper portion with a pin 74a. The transfer lever 53 is connected to the pin 74a so as to be swingable. The transfer plate 74 is provided on its lower portion with a pair of guide pins 74b. The guide pins 74b are fitted into a transfer plate-guide groove 91 that is formed on the load base 50 so as to be slidable along the transfer plate-guide groove 91 (see FIG. 8). The transfer lever 53 with hatching in FIG. 7 is formed into an L-shape in the plan. The transfer lever 3 is provided on its one end with a hook portion 53a, which can engage with the pin 74a, and on the other end with a pawl 53b, which can fit into the fitting hole 60a of the disc 60. The transfer lever 53 is provided on its lower portion with a pin 53c that serves as a portion to be guided, which is to be fitted into the cam groove 92 serving as a guide member, formed on the load base 50 (see FIGS. 8 and 9). The pin 53c has a straight portion 94, which is obtained by cutting the cylindrical shape partially. A coil spring 93 locates between the transfer plate 74 and the transfer lever 53 so as to push resiliently the transfer lever 53 in a direction A in FIG. 7.

Figure 8:
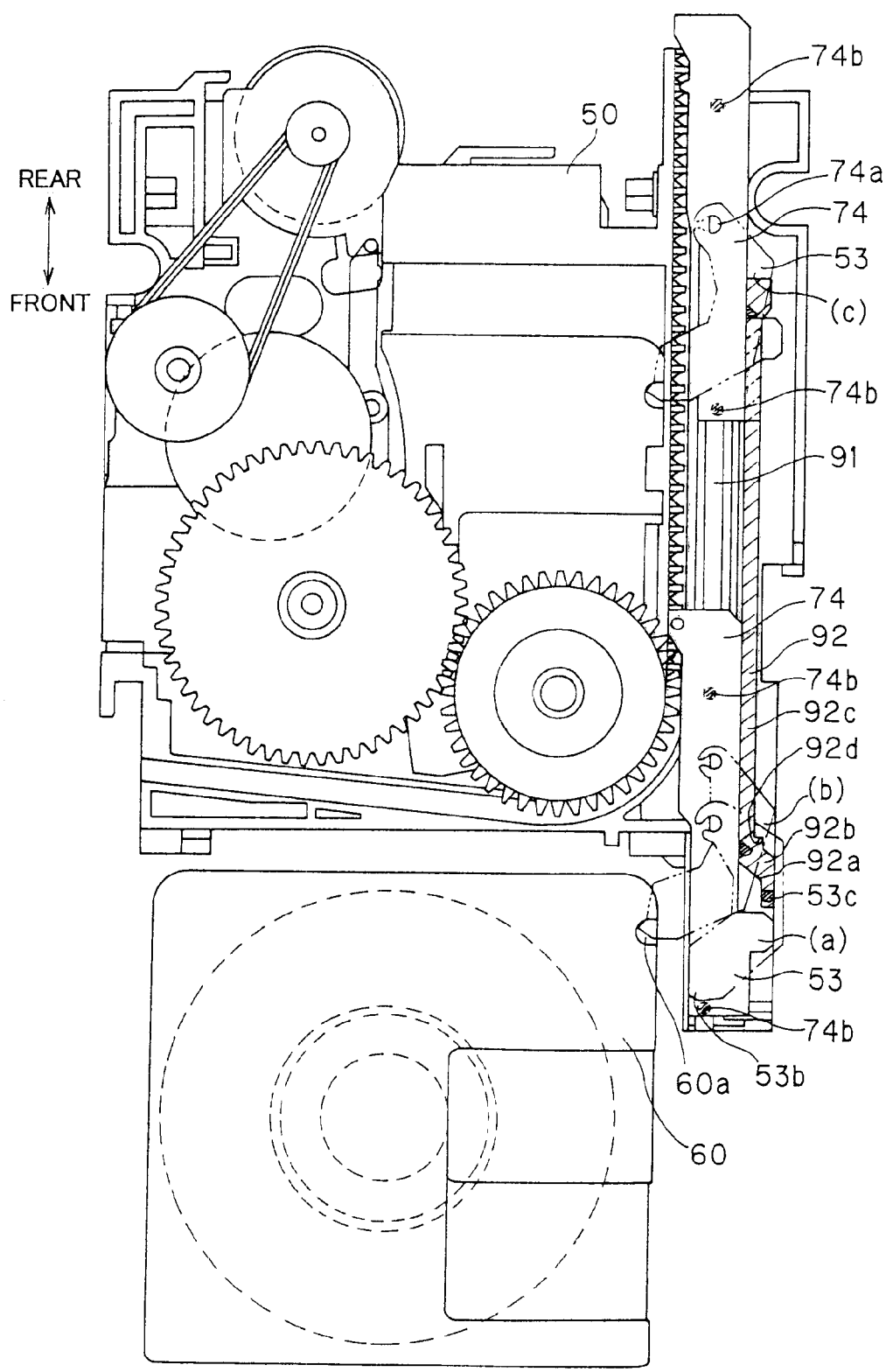
FIG. 8 is a plan view illustrating a transfer operation in case where the disc is inserted in a proper manner.
Figure 9:
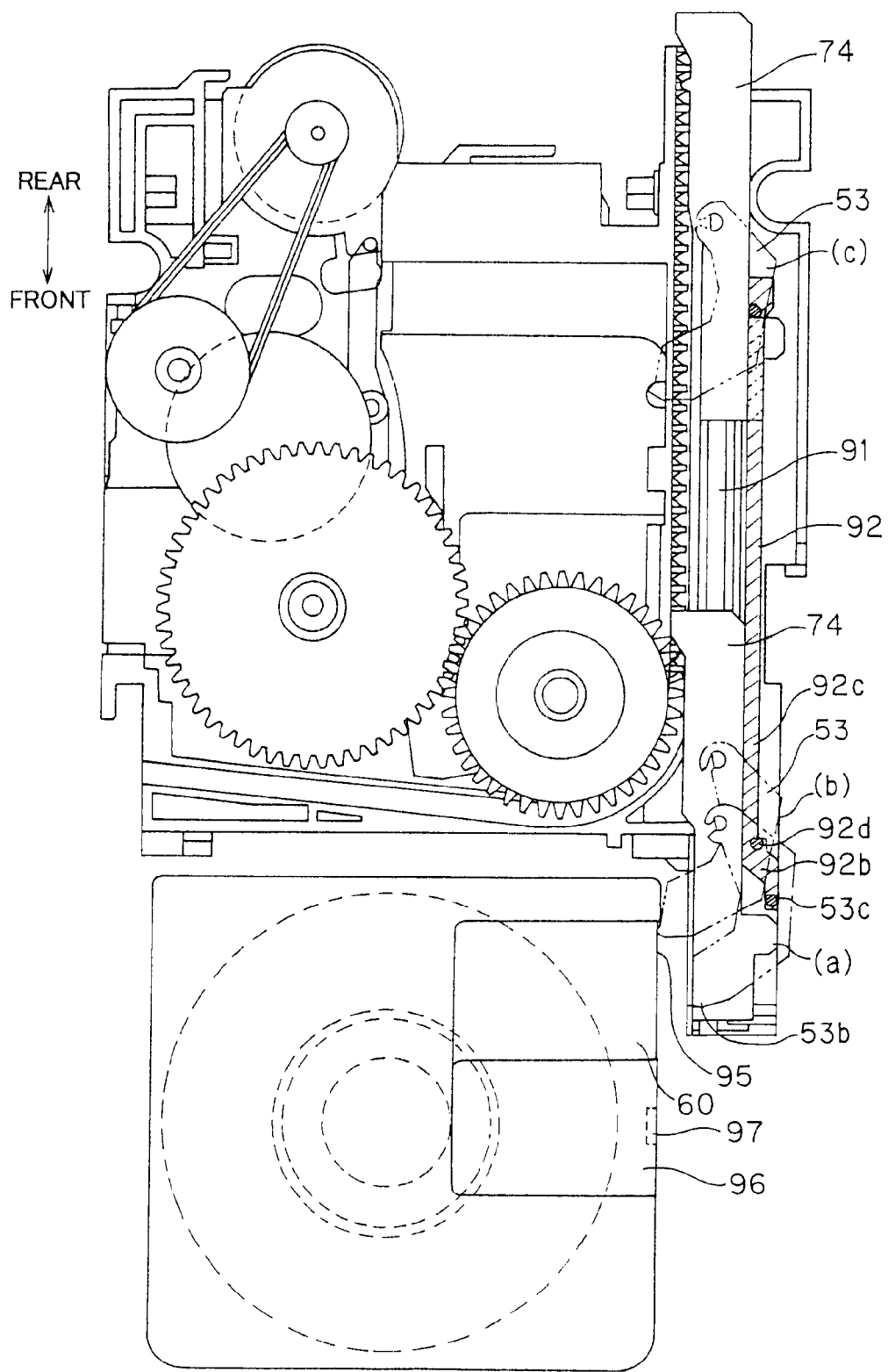
FIG. 9 is a plan view illustrating a transfer operation in case where the disc is inserted in an upside-down improper manner.

FIGS. 8 and 9 illustrate a disc insertion-error detection mechanism. The disc insertion-error detection mechanism prevents the disc 60 from being transferred when the disc 60 is inserted into the receiving unit 2 in an upside-down improper manner. The depth of the recess portion of the disc, into which the transfer lever 53 is to be fitted when the disc 60 is inserted into the receiving unit 2 in an upside-down improper manner, is not identical with the depth of a recess portion of the disc 60, into which the transfer lever 53 is to be fitted when the disc 60 is inserted into the receiving unit 2 in a proper manner. The disc insertion-error detection mechanism utilizes this fact and causes the pin 53c to engage with the cam groove 92 unless the swing angle of the transfer lever exceeds the prescribed value. The cam grove 92 has an inclined portion 92b for withdrawing the pawl 53b of the transfer lever 53 to a standby-position, a linear portion 92c by which the pin 53c of the transfer lever 53 is guided after the swing angle of the transfer lever 53 exceeds the prescribed value, and a stop portion 92d serving as the restriction member, with which the pin 53c engages when the swing angle of the transfer lever 53 does not exceed the prescribed value.

Description will be given below of transfer operation of the disc in case where it is inserted in a proper manner. The transfer lever 53 moves rearward from the standby-position (that is denoted by (a) in FIG. 8) together with the transfer plate 74 as shown in FIG. 8. The transfer lever 53, which is resiliently pressed on the inner wall surface 92a of the inclined portion 92b by means of the coil spring 93, swings by a prescribed amount of angle along with the rearward movement of the transfer plate 74, with the result that the pawl 53b is fitted into the fitting hole 60a of the disc 60 (that is denoted by (b) in FIG. 8). The further rearward movement of the transfer plate 74 causes the pin 53c to move to the linear portion 92c of the cam groove 92 so that the transfer lever 53 moves to the insertion completion position (that is denoted by (c) in FIG. 8). The disc is transferred to the prescribed position in this manner.

Description will be given below of operation in case where the disc is inserted in an upside-down improper manner. The transfer lever 53 moves rearward from the standby-position (that is denoted by (a) in FIG. 9) together with the transfer plate 74 as shown in FIG. 9. Although the transfer lever 53, which is resiliently pressed on the inner wall surface 92a of the inclined portion 92b by means of the coil spring 93, swings, the swing angle of the transfer lever 53 does not exceed the prescribed value due to the small depth of the recess portion 95 of the disc 60 as denoted by "b" in FIG. 9. In such a state, even when the transfer plate 74 moves rearward, the pin 53c engages with the stop portion 92d of the cam groove 92, thus restricting the rearward movement of the transfer lever 53. Provision of the straight portion 94 on the pin 53c ensures a proper engagement of the pin 53c with the stop portion 92d. When the disc insertion-error detection mechanism is not provided, the transfer lever 53 may engage with the shallow recess portion 95 to transfer the disc 60. In case of such an erroneous transfer of the disc, when an error is detected based on the other error detection factors to restore the disc to the original position (in the receiving unit 2), no problem is caused. The restoration operation is carried out, unlike the transfer operation, by means of the transfer lever 53 on the basis of the position of the recess portion 97 formed on the shutter 96 of the disc 60. The engagement position of the transfer lever 53 with the disc in such an erroneous transfer state is different from that in a proper transfer state so that the disc cannot be returned completely, thus keeping the disc in an improper position, i.e., in the middle of the receiving unit 2. The disc insertion-error detection mechanism has a function of permitting to transfer only the disc 60 that is inserted in a proper manner, without providing any device for detecting the insertion direction of the disc 60 in the receiving unit 2. It is therefore possible to simplify the structure of the receiving unit 2.

Description will be given in detail below of the gear train 71 of the disc transfer apparatus 90. The gear train 71 includes a gear pulley 77 to which the rotational power of the transfer unit driving motor 70 is transmitted by a belt, a gear 78 engaging with the gear pulley 77, a lower gear cam 79 engaging with the gear 78, an upper gear cam 80 that is provided above the lower gear cam 79 so as to be coaxial with it, and a pinion 72 engaging with the upper gear cam 80. The lower gear cam 79 as the driver and the four followers serve as kinematic pair. More specifically, the rotation of the lower gear cam 79 causes ① the rotation of the pinion 72, ② the forward or rearward movement of the pawl 57 from the transfer unit 6 (see FIG. 11), ③ the movement of the magnetic head 23 in the vertical direction and ④ warp of the leaf spring 81 placed on the upper surface of the disc 60 (see FIG. 11).

Figure 10:
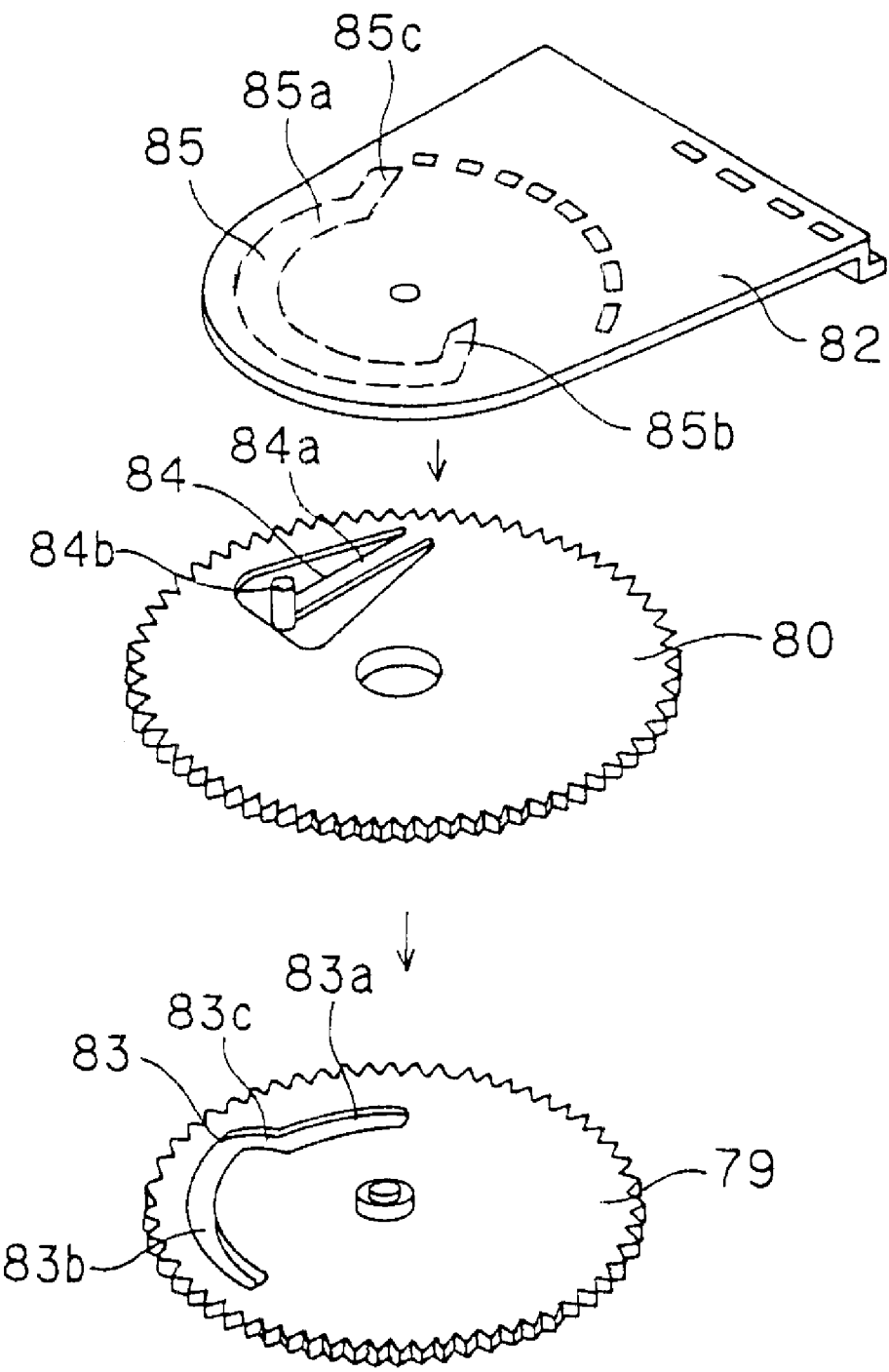
FIG. 10 is a perspective view illustrating upper and lower gear cams.

① First, description will be given below of the rotation mechanism of the pinion 72. The pinion 72 engages with the upper gear cam 80 as described above. The rotation of the upper gear cam 80 suffices in order to rotate the pinion 72. FIG. 10 illustrates the upper gear cam 80, the lower gear cam 79 and a press cam 82. The lower gear cam 79 engages with the gear 78 and is rotated by driving the transfer unit driving motor 70. The lower gear cam 79 has on its upper surface a groove 83. The groove 83 has an inner peripheral side arcuate groove 83a, an outer peripheral side arcuate groove 83b and a connection groove 83c connecting these arcuate grooves 83a, 83b to each other. The upper gear cam 80 is provided with a selection device 84 for selectively transmitting the rotation of the lower gear cam 79 to the upper gear cam 80. The selection device 84 is formed into a uvula palatina-shape and has a leaf spring 84a and a pin 84b provided on the tip end of the leaf spring 84a. The pin 84b is inserted into a groove 83 formed on the lower gear cam 79. The press cam 82 is placed on the upper surface of the upper gear cam 80. The press cam 82 is fixed to the transfer unit 6. The press cam 82 also has on its lower surface a groove 85 into which the pin 84b is inserted. The groove 85 has an arcuate groove 85a, an inner peripheral side groove 85b extending inside from the one end of the arcuate groove 85a and an outer peripheral side groove 85c extending outside from the other end of the arcuate groove 85a.

The selection device 84 provides the first mode in which the upper gear cam 80 can rotate together with the lower gear cam 79, the second mode in which only the lower gear cam 79 can rotate but the upper gear cam 80 cannot rotate and the third mode in which neither upper gear cam 80 nor lower gear cam 79 cannot rotate.

First, description will be given below of the first mode in which the upper gear cam 80 can rotate together with the lower gear cam 79. When the pin 84b is received in the arcuate groove 85a of the press cam 82, the pin 84b locates in the middle position without moving in any direction of right-hand side or left-hand side. In this state, the pin 84b is fitted into the middle of the connection groove 83c of the lower gear cam 79. The lower gear cam 79 can rotate together with the upper gear cam 80 in such a state.

Description will be given below of the second mode in which only the lower gear cam 79 can rotate but the upper gear cam cannot rotate. When the upper gear cam 80 rotates together with the lower gear cam 79 and then the pin 84b moves to the outer peripheral side groove 85c of the press cam 82, the rotation of the upper gear cam 80 is stopped. The pin 84 moves toward the outer peripheral side to come in the outer peripheral side arcuate groove 83b of the lower gear cam 79 so that the lower gear cam 79 rotates by a larger rotational angle than that of the upper gear cam 80, which corresponds to the length of the outer peripheral side arcuate groove 83b. When the upper gear cam 80 rotates together with the lower gear cam 79 and then the pin 84b moves to the inner peripheral side groove 85b of the press cam 82 in the similar manner, the rotation of the upper gear cam 80 is stopped. Even when the rotation of the upper gear cam 80 is stopped, the lower gear cam 79 rotates by a larger rotational angle than that of the upper gear cam 80, which corresponds to the length of the inner peripheral side arcuate groove 83a.

Description will be given below of the third mode in which neither upper gear cam 80 nor lower gear cam 79 cannot rotate. When the pin 84b moves to the end of the groove 85 of the press cam 82, the rotation of the upper gear cam 80 is stopped as described above. Then, only the lower gear cam 79 can rotate. When the end of the groove 83 of the lower gear cam 79 reaches the pin 84b, the rotation of the lower gear cam 79 is also stopped.

Description will be given below of the entire operation of the upper gear cam 80 and the lower gear cam 79. The drive of the transfer unit-driving motor 70 causes only the lower gear cam 79 to rotate at the first stage. Then, the upper gear cam rotates together with the lower gear cam 79. Then, the rotation of the upper gear cam is stopped and only the lower gear cam 79 rotates. Then, the rotation of the lower gear cam 79 is also stopped. The drive of the transfer unit-driving motor 70 in the reverse direction causes the same operation as mentioned above.

Figure 11:
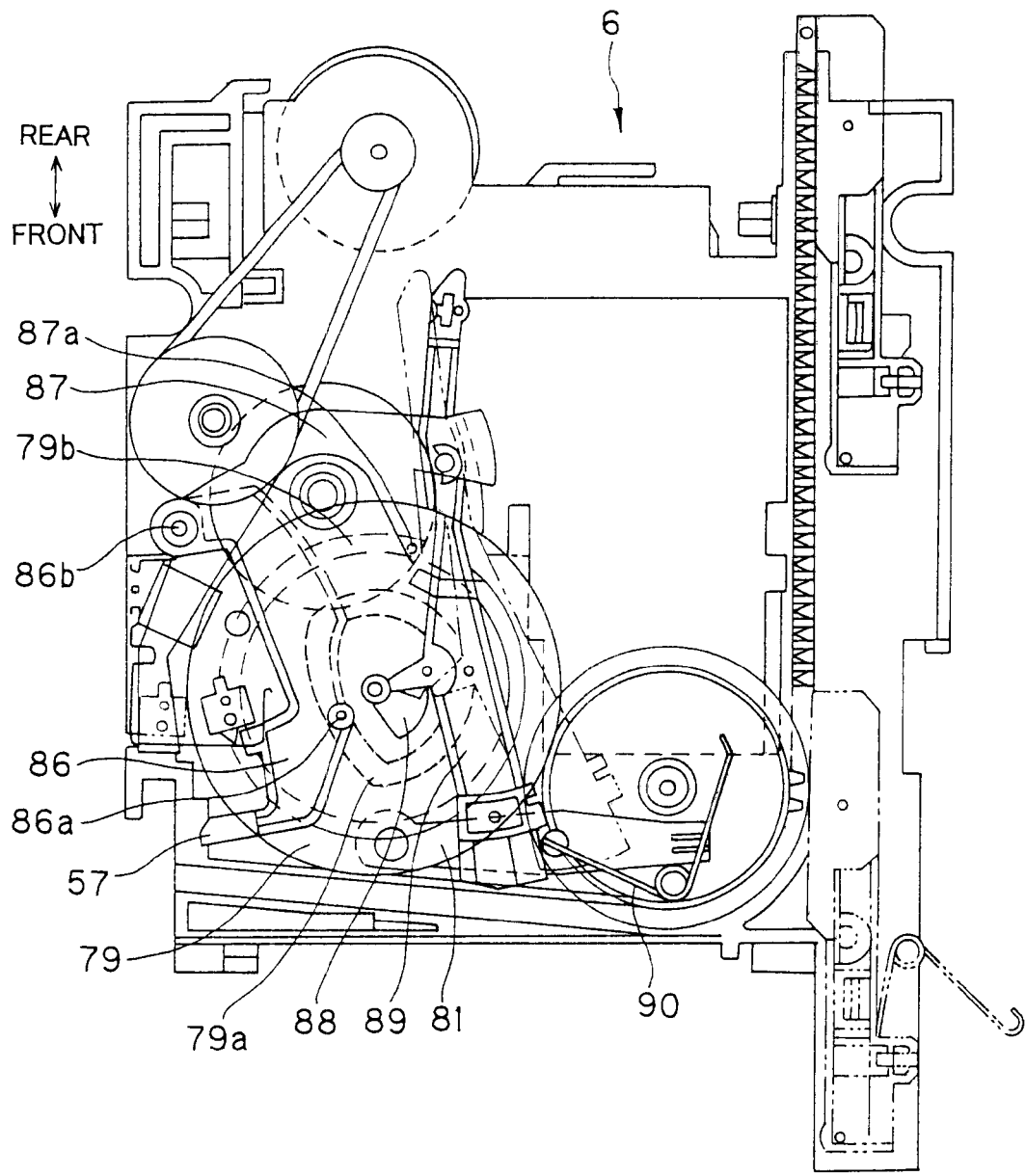
FIG. 11 is a plan view illustrating the lower portion of the transfer unit.

② Description will be given below of the mechanism for projecting the pawl 57 from the transfer unit 6. The lower gear cam 79 is provided on the lower surface with a groove 79a as shown in FIG. 11. A swing lever 86 has a cam-engaging pin 86a that is inserted into the groove 79a. The swing lever 86 is provided at the tip end with the pawl 57. The rotation of the lower cam gear 79 causes the cam-engaging pin 86a to slide along the groove 79a. As a result, the swing lever 76 swings around the swing support point 86b so as to project or withdraw the pawl 57 from the transfer unit 6. The pawl 57 is fitted into any one of positional determination openings 58 that are provided so as to correspond to the slots 13 (see FIG. 12). When the transfer unit 6 is lifted to a prescribed level in accordance with instructions of a user, the transfer unit-driving motor 70 operates to project the pawl 57 so as to make a positional determination of the transfer unit 6 in the vertical direction. The pawl 57 has a tapered tip end. The pawl 57 can be fitted into the positional determination opening 58 even when the transfer unit 6 locates in a position, which is slightly different from the prescribed position.

③ Description will be given below of the mechanism for moving the magnetic head 23 in the vertical direction. The lower gear cam 79 is provided with a groove 79b. A head-moving cam 87 has a cam-engaging pin 87a that is inserted into the groove 79b. The rotation of the lower cam gear 79 causes the cam-engaging pin 87a to slide along the groove 79b. As a result, the head-moving cam 87 swings around the swing support point 86b. A head-moving lever 24 (see FIG. 2) comes into contact with the head-moving cam 87. Accordingly, the swing of the head-moving cam 87 causes the magnetic head 23 to move in the vertical direction. The drive of the transfer unit-driving motor 70 causes the magnetic head 23 to approach the disc 60 during the recording mode for the disc 60 and to withdraw from the disc 60 during the reproduction mode.

④ Description will be given below of the mechanism for warping the leaf spring 81, which is placed on the upper surface of the disc 60. The lower gear cam 79 is provided with a periphery cam 88 having a specific contour curve. A leaf spring-lever 89 is pressed on the contour of the periphery cam 88 by means of a spring 90. The rotation of the lower gear cam 79 causes the leaf spring-lever 89 to swing along the contour of the periphery cam 88. The leaf spring 81 is provided on its upper surface with a projection that comes into contact with the leaf spring-lever 89. The swing of the leaf spring-lever 89 causes the leaf spring 81 to warp downward. The rotation of the transfer unit-driving motor 70 causes the leaf spring 81, which is placed on the upper surface of the disc 60, to warp so as to press the disc 60 downward. The playback unit 5 is provided with a tapered positional determination projection and a detent projection. When the transfer unit 6 is moved downward and the disc 60 is placed on a turntable of the playback unit 5, there is made a positional determination to place the cartridge of the disc 60, to which a downward resilient force is applied by means of the leaf spring 81, in a proper position. The playback unit 5 is provided with a record prevention-protrusion switch for preventing information from being recorded on the disc on which the other information has already been recorded. The protrusion switch automatically operates when a premastered disc or a disc 60 in which a non-recordable mode is maintained by means of a write inhibition device is placed on the playback unit 5. The leaf spring 81 locates in the vicinity of the protrusion switch in order to ensure a proper operation of the protrusion switch.

The playback unit 5 to make record or reproduction of information is swingably mounted on the base unit 1. The playback unit 5 comprises a playback base 15 having a rectangular shape, a spindle motor driving system 4 for driving the disc to rotate, a pickup driving system 16 on which an optical pickup 3 for reading information recorded on the disc 60 is mounted, and a magnetic recording head system 19 for applying magnetic field modulation to the disc 60.

The spindle motor driving system 4 is a well-known mechanism having a spindle-driving motor and a turntable that is directly connected to the rotation shaft of the spindle-driving motor.

The pickup driving system 16 is a well-known mechanism that is composed of a guide shaft 17 secured on the playback base 15, a pickup 3 guided by the guide shaft so as to be linearly movable, and a driving mechanism 20 for reciprocating the pickup 3. A pickup-driving motor causes, in cooperation with such a pickup driving system 16, the pickup 3 to move in the diametrical direction of the disc 60.

The magnetic head system 19 is obtained by providing a leaf spring 22 on a stay 21 projecting from the pickup 3, and providing the magnetic head 23 on the front end of the leaf spring 22. There is provided below the magnetic head a head-moving lever 24 for warping upward the leaf spring 22, so as to be swingable. The head-moving lever 24 swings so that the magnetic head 23 comes into contact with the disc 60 during the recording mode for the disc 60 and to withdraw from the disc 60 during the reproduction mode. The head-moving lever 24 is swung by means of the above-described head-moving cam 87.

The playback unit 5 has on its opposite ends swing support points 5b, 5c that are pivotably connected to the base unit 1 and the transfer unit 6, respectively. More specifically, the playback unit 5 is provided at its front end with a swing support shaft 5b, which is supported by the bearing 1c of the base unit 1. As a result, the playback unit 5 can swing relative to the base unit 1 around the swing support shaft 5b. The playback unit 5 is provided at its rear end with the bearing 5c, which supports a swing support shaft 6a of the transfer unit 6. As a result, the transfer unit 6 can swing relative to the playback unit 5 around the swing support shaft 6a. The playback unit 5 is provided on the opposite side surfaces of its central portion with gears 8, which are rotatably supported by shafts 8a so as to engage with the gear-segment portions 7 of the base unit 1 and the transfer-unit gears 25. The gears 8 also engage with synchronization gears 26 provided on the opposite side surfaces of the playback unit 5. The synchronization gears 26 are fixed to the opposite ends of a shaft so as to rotate integrally with each other. Accordingly, the pair of gears 8 also rotates in the same velocity.

Figure 13:
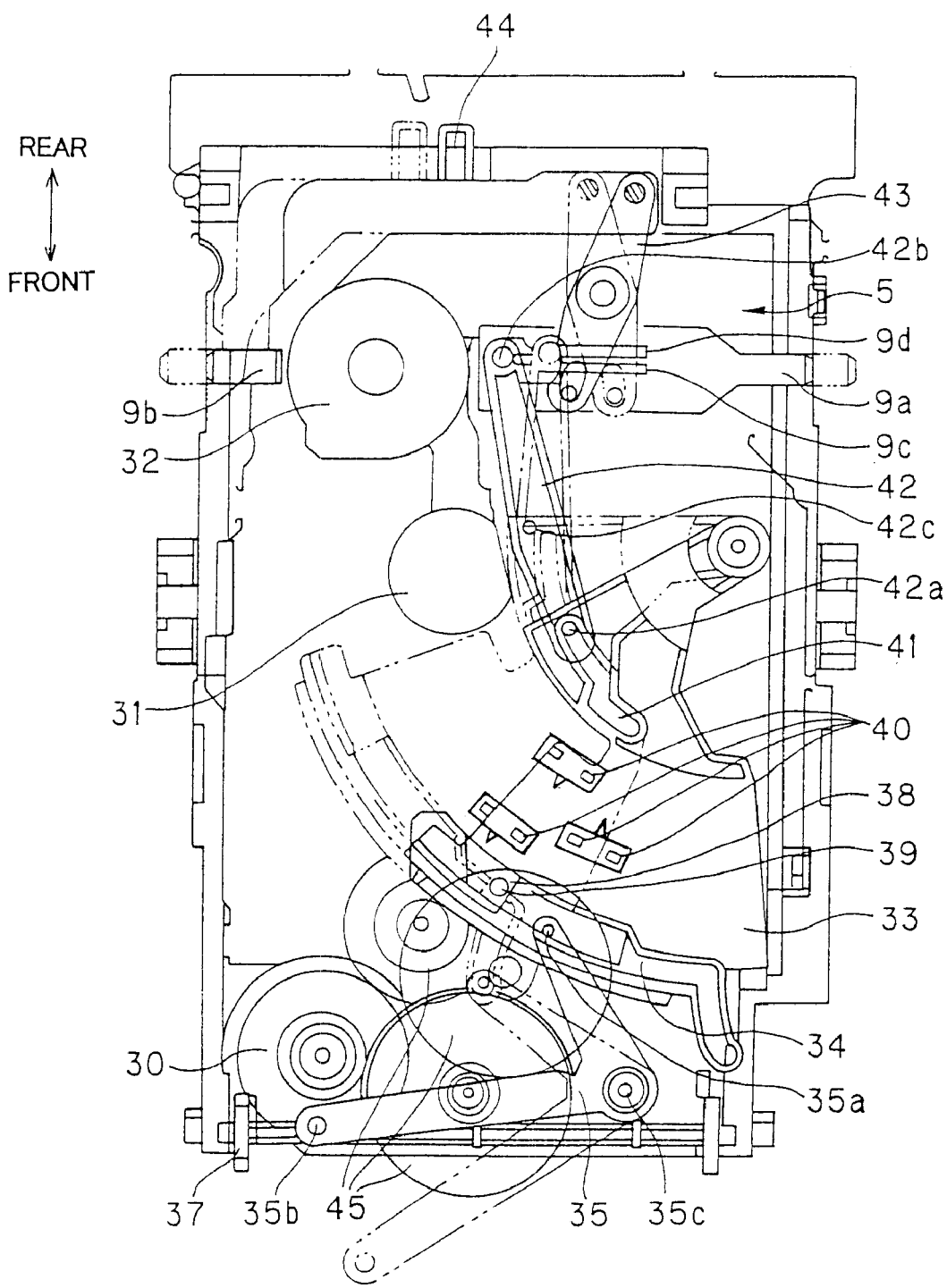
FIG. 13 is a plan view illustrating the lower portion of a playback unit.

FIG. 13 is a plan view illustrating the lower portion of the playback unit. The playback unit has three motors serving as the driving source. The first is a spindle-driving motor 31 for rotating the above-mentioned turntable 4, the second is a pickup driving motor 32 for driving the above-mentioned pickup 3 and the third is a playback unit-cam driving motor 30 for swinging a cam 33 provided on the playback unit. When the playback unit-cam driving motor 30 is driven, the rotational velocity of it is reduced by a gear train 45 and the cam 33 having on the outer periphery the gear teeth rotates. The change in the rotational direction of the playback unit-cam driving motor 30 causes the cam 33 to be reciprocated between two positions that are indicated by solid lines and two-dot chain lines in FIG. 13. The cam 33 as the driver and three followers serve as kinematic pair. More specifically, the swing of the cam 33 causes ① the forward and rearward reciprocal linear movement of the receiving unit 2 relative to the base unit 1, ② the reciprocal swing motion of the playback unit 5 relative to the base unit 1 and ③ the movement of the wedge portion 9 to project or withdraw relative to the playback unit 5.

① First, description will be given below of the mechanism for making the forward and rearward reciprocal linear movement of the receiving unit relative to the base 1. The cam 33 is provided with a groove 34. An ejection lever 35 having an L-shape is provided on its end with a cam engaging pin 35a, which is inserted into the above-mentioned groove 34. The swing of the cam 33 causes the cam engaging pin 35a to slide along the groove 34. Accordingly, the ejection lever 35 swings around a swing support point 35c. The reciprocal swing motion of the cam 33 causes the ejection lever 35 to be reciprocated between two positions that are indicated by solid lines and two-dot chain lines in FIG. 13. The ejection lever is provided on the other end with a receiving unit-engaging pin 35b, which is inserted into a slotted hole formed in the receiving unit 2. The swing motion of the ejection lever 35 causes the receiving unit 2 to linearly move relative to the base unit 1. The receiving unit 2 is provided on its under surface with a pair of racks 36 extending in the horizontal direction (see FIG. 12). The racks 36 engage with synchronization pinions 37 pivotably supported on the playback unit 5. According to such a structure, it is possible to maintain the balance of the receiving unit 2 at the right and left-hand sides when the receiving unit 2 moves forward or rearward.

② Then, description will be given below of the mechanism for making the reciprocal swing motion of the playback unit 5 relative to the base unit 1. The cam 33 has a stair portion 38 with three steps. The stair portion is placed on a pin 39 projecting from the base unit 1 in a perpendicular direction to the cam 33 (see FIG. 13). When the cam 33 swings, it runs on the pin 39 as the sequential first to third steps (see FIG. 13). The playback unit 5 to which the cam 33 is mounted, swings per se at the three stages. In order to ensure a prescribed swing angle of the playback unit 5, it is necessary to cause the cam 33 to stop when the pin 39 reaches the landing of the stair portion 38. In view of this fact, there are provided three switches 40 for detecting the swing angle of the cam 33.

③ Then description will be given below of the mechanism for moving the wedge portion 9 to project or withdraw relative to the playback unit 5. The cam 33 is provided on its middle portion with a groove 41, into which a cam engaging pin 42a provided on the one end of a link 42 is inserted. The reciprocal swing motion of the cam 33 causes the link 42 to swing around the swing support point 42c from the position indicated in the solid lines to the position indicated in the two-dot chain lines in FIG. 13. The wedge portion 9a is provided on the other end of the link 42 so as to serve as revolute pair. The swing of the link 42 causes the wedge portion 9a to project or withdraw from the playback unit 5. A link 43 is provided also between the wedge portion 9a and the wedge portion 9b to serve as revolute pair so that the wedge portions 9a, 9b can project or withdraw in a bilaterally symmetrical manner. Each of the wedge portions 9a, 9b has a tapered tip end that is fitted into a fitting hole formed on the wedge-side wall 10 of the base unit 1 and another fitting hole formed on the other wedge-side wall 46 (see FIG. 1) of the transfer unit 6. In case of no provision of a wedge portion 9, when the disc changer is placed upside down, the playback unit 5 may swing, with the result that an element between the transfer unit 6 and the base unit 1 expands and contracts like an accordion. Accordingly, the element between the transfer unit 5 and the base unit 1 may be kept in an expanded state when the disc changer is transported. It is however possible to kept the playback unit 5 and the transfer unit 6 in their appropriate positions relative to the base unit 1 by providing the wedge portions 9a, 9b that can project from the playback unit 5.

Figure 14:
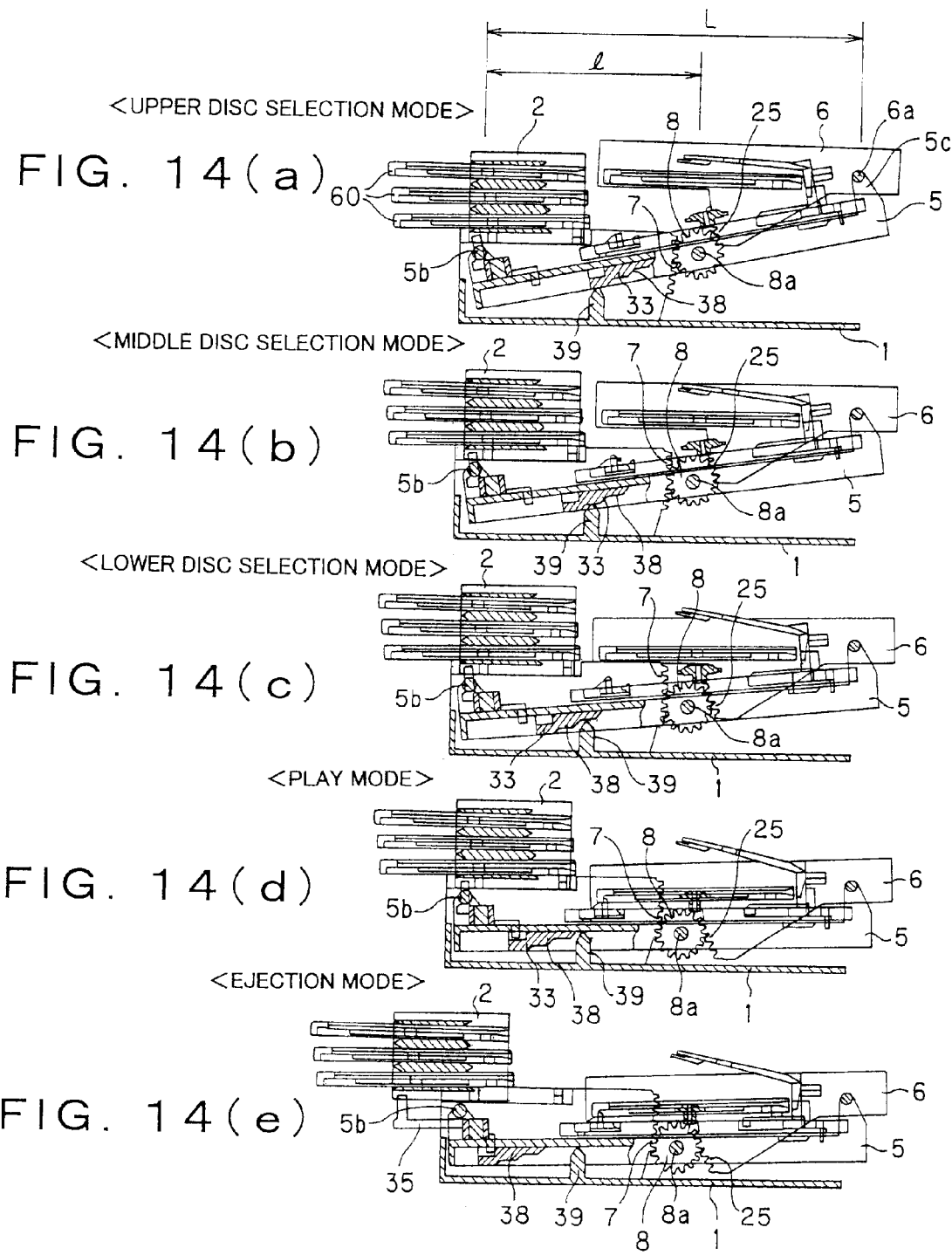
FIGS. 14(*a*) to 14(*e*) are views illustrating principle of mechanical operation of the disc changer as shown in FIG. 1.
Figure 15:
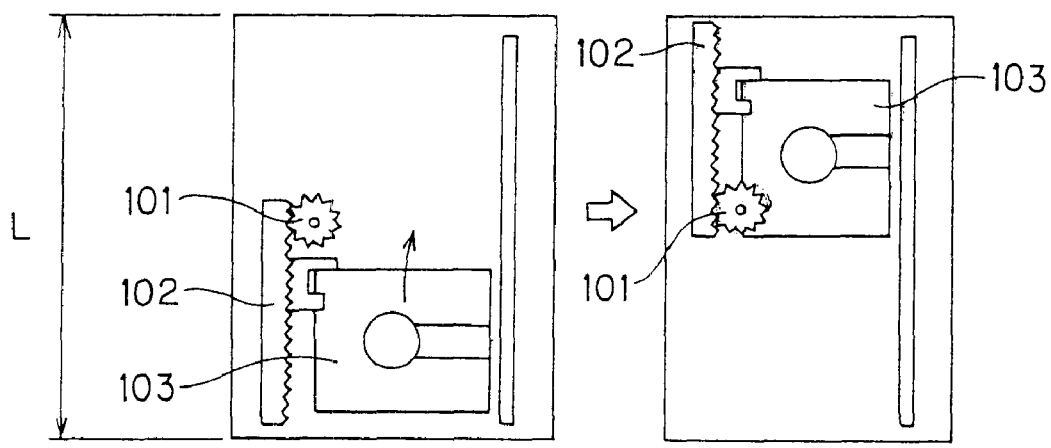
FIG. 15 is a plan view illustrating the conventional disc transfer apparatus.
Figure 16:
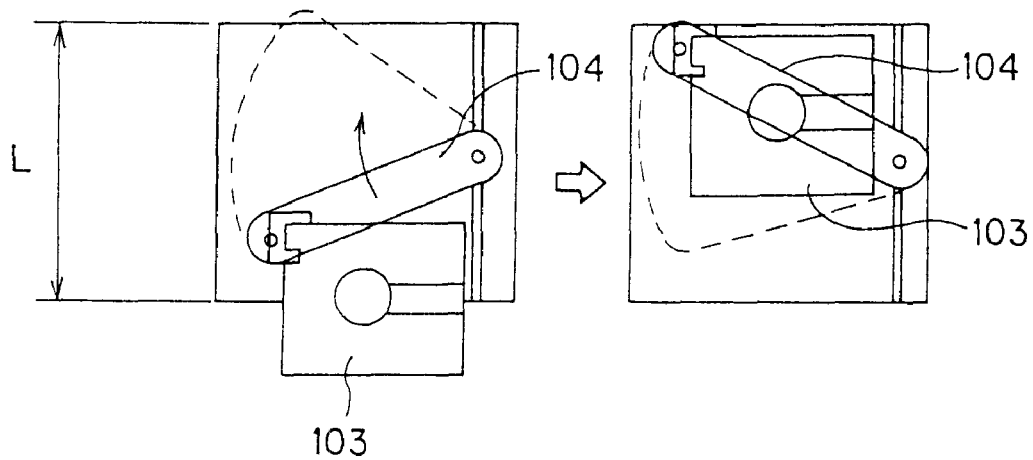
FIG. 16 is a plan view illustrating the other conventional disc transfer apparatus.

FIGS. 14(a) to 14(e) illustrate principle of mechanical operation of the changer. In the disc changer of the present invention, the single motor, i.e., the playback unit-cam driving motor 30 performs an ejection operation of sliding the receiving unit 2 forward or rearward relative to the base unit 1 to eject simultaneously the plurality of discs, for example, three discs as well as a selection operation of moving the transfer unit 6 to the prescribed position for the disc 60 in the vertical direction. First, the selection operation will be described. The receiving unit 2 receives three discs 60. The transfer unit 6 moves vertically so as to keep a parallel state with the base unit 1 in accordance with the position of the received disc 60. The position of the transfer unit 6 in the vertical direction can be adjusted by the stair portion 38 of the cam 33. The stair portion 38 has the three steps. The swing angle of the playback unit 5 can be adjusted at three steps by causing the cam to run on the pin 39 of the base unit 1. FIG. 14(a) illustrates an upper disc selection mode in which the transfer unit 6 locates in a position of the upper disc 60. FIG. 14(b) illustrates a middle disc selection mode in which the transfer unit 6 locates in a position of the middle disc 60. FIG. 14(c) illustrates a lower disc selection mode in which the transfer unit 6 locates in a position of the lower disc 60. FIG. 14(d) illustrates a play mode in which the transfer unit 6 locates in the lower most position. In such a play mode, reproduction process of information of the disc 60 is carried out. The cam 33 appears to slide on the playback unit 5 in FIGS. 14(a) to 14(d). The swing motion of the cam 33 is practically carried out as described above.

The gear 8, which engages with the transfer unit-gear 25 of the transfer unit 6, supports the one end of the transfer unit 6 and the bearing 5c of the playback unit 5 supports the other end (i.e., the rotation shaft 6a) of the transfer unit 6. The downward movement of the transfer unit 6 is provided by operating the stair portion 38 of the cam 33 to turn the playback unit 5 in the clockwise direction. The turn of the playback unit 5 in the clockwise direction causes the gear 8, which engages with the base unit-gear 7, to move downward while turning in the clockwise direction. The gear 8 also engages with the transfer unit-gear 25 and the turn of the gear 8 in the clockwise direction causes the transfer unit-gear 25 to move downward. As a result, the transfer unit-gear 25 moves by a distance, which is about twice as much as the moving distance of the rotation shaft 8a of the gear 8.

In the disc changer of the present invention, the ratio of the distance "1" from the swing support point 5b of the playback unit 5, which locates in the base unit side, to the rotation shaft 8a of the gear 8 relative to the distance "L" from the swing support point 5b locating in the base unit side to the swing support point 6a locating in the transfer unit side (i.e., 1/L) is determined as about "1:2". As a result, the swing support point 6a of the transfer unit 6 can move downward by a distance which is about twice as much as the moving distance of the rotation shaft 8a. More specifically, the transfer unit-gear 25 and the swing support point 6a of the transfer unit 6 can move downward by the same distance so that the transfer unit 6 can move linearly, maintaining a parallel posture with the base unit 1. Under the function of the synchronization gear, the pair of gears 8 provides the same movement so as not to make different movement from each other. Consequently, the four corners of the transfer unit 6 can move downward by the same distance.

An ejection operation will be described. When the transfer unit is kept in a descent state and the playback cam driving motor 30 is driven to turn the cam 33, there occurs overstroke of the cam 33 to turn the ejection lever 35. The turn of the ejection lever 35 causes the receiving unit 2 to slide so as to carry out an ejection operation.

Finally, the entire operation of the disc changer will be described. The operations ① to ⑥ after the insertion of disc 60 before the reproduction of information recorded on the disc will be described in time sequence.

① With respect to the ejection operation, the playback cam driving motor 30 of the playback unit 5 is driven and the receiving unit 2 is moved forward relative to the base unit 1. The receiving unit 2 comes into contact with a front cover pivoted on an audio equipment to open the front cover, along with the movement of the receiving unit 2. In this state, a plurality of discs 60 are received by an insertion operation of a user. The positional restriction lever 61 that is provided on the receiving unit restricts an insertion distance of the disc 60. When the disc 60 is received in a prescribed position, the supporting member is fitted into the hole of the shutter so as to support the disc 60. Then, the receipt completion lamp lights up.

② After the disc is inserted, the playback unit-cam driving motor 30 of the playback unit 5 operates in the reverse direction to move the receiving unit 2 rearward relative to the base unit 1. The front cover of the audio equipment closes along with the rearward movement of the receiving unit 2.

③ With respect to the selection operation, the playback unit 5 swings in accordance with the user's instructions of selection of a certain disc 60 and the transfer unit 6 moves upward to the position of the disc 60 to be transferred. The positional restriction lever 61 for restricting the insertion distance of the disc 60 swings along with the upward movement of the transfer unit 6 so that the disc 60 can be transferred from the receiving unit 2 to the transfer unit 6.

④ With respect to the disc-loading operation, the drive of the transfer unit-driving motor 70 of the transfer unit 6 causes the pawl 57 to project from the transfer unit 6 so as to come into the positional determination opening 58 of the receiving unit 2. The further drive of the transfer unit-driving motor 70 causes the transfer lever 53 to engage with the fitting hole 60a of the disc 60, resulting in the withdrawal of the disc 60 together with the transfer lever 53. The shutter engaging plate provided on the transfer unit 6 engages with the shutter during the withdrawal operation of the disc 60, to open the shutter. When the withdrawal of the disc 60 is completed, the pawl 57 projecting from the transfer unit 6 withdraws from it. The leaf spring presses the disc 60 downward. When the record on the disc 60 is carried out, the further drive of the transfer unit driving motor 70 causes the magnetic head 23 to be pressed down. When only the reproduction of information recorded on the disc 60 is carried out, the magnetic head 23 is kept in the withdrawal state without driving the transfer unit driving motor 70.

⑤ The drive of the playback unit-cam driving motor 30 causes the transfer unit to move down. The disc 60 is placed on the turntable 4 of the playback unit 5. The further drive of the playback unit-cam driving motor 30 after completion of the decent operation of the transfer unit 6 causes the wedge portion 9 to project from the playback unit 5 so that the playback unit 5 and the transfer unit 6 is secured to the base unit 1.

⑥ Then, the turntable 4 of the playback unit 5 turns and the pickup 3 moves in the diametrical direction of the disc 60 to carry out the reproduction of information recorded on the disc 60.

Now, description will be given below of an operation of discharging the disc 60 after the completion of reproduction of information.

① The drive of the playback unit-cam driving motor 30 causes the wedge portion 9 to withdraw after the completion of the reproduction of information. The further drive of the playback unit-cam driving motor 30 causes the transfer unit 6 to move upward to the original position in which the disc 60 has been received.

② With respect to the disc-unloading operation, the transfer unit driving motor 70 is driven after the completion of the moving operation of the transfer unit 6 to a prescribed position, with the result that the pressure of the leaf spring to the disc 60 is released. The further drive of the transfer unit driving motor 70 causes the pawl 57 to project from the transfer unit 6 so that the transfer unit 6 engages with the receiving unit 2. The further drive of the transfer unit driving motor 70 causes the disc 60 to move forward together with the transfer lever 53 so as to return the disc 60 to the receiving unit 2. The supporting member engages with the hole of the shutter of the cartridge during the returning operation of the disc 60 to the receiving unit 2, to close the shutter. The further drive of the transfer unit driving motor 70 causes the pawl 57 to withdraw from the transfer unit 6.

③ The drive of the playback unit-cam driving motor 30 causes the transfer unit 6 to move down. The further drive of the playback unit-cam driving motor 30 causes the wedge portion 9 to project from the playback unit 5 so that the transfer unit 6 and the playback unit 5 are secured to the base unit 1.

④ The further drive of the playback unit-cam driving motor 30 causes the ejection lever 35 to press the receiving unit 2 forward so as to carry out the election operation.

The embodiment of the present invention is described as the apparatus for transferring the disc. The present invention is not limited only to the disc transfer apparatus, but may be applied to any other transfer apparatus for a movable body so long as the movable body is transferred with the use of the rack and pinion mechanism.

According to the present invention as described in detail, the apparatus comprises the rack having flexibility, the pinion for driving the rack and the guide device for guiding the rack in its movement, which guide device has a curved portion. The use of the rack and pinion mechanism in the movable body transfer apparatus makes it possible to avoid the existence of useless space above the disc, thus reducing the height of the apparatus. The curved portion of the guide device for guiding the flexible rack makes it possible to curve the flexible rack in the running passage of the flexible rack, thus permitting to improve degree of freedom and reduce the depth of the apparatus.

What is claimed is:

1. An apparatus for transferring a movable assembled body comprising a plurality of components, said apparatus comprising:

a rack for transferring said movable assembled body, said rack having flexibility;

a pinion for driving said rack; and a guide device for guiding said rack for movement thereof, said guide device having a curved portion for receiving the flexible rack.

2. The apparatus as claimed in claim 1, wherein:

said pinion is located along said curved portion of said guide device.

3. The apparatus as claimed in claim 2, wherein:

said rack has a tooth shape having a smaller profile than a depth of said rack, said smaller profile tooth shape being engageable by said pinion.

4. The apparatus as claimed in claim 3, wherein:

said rack has engagement portions with said pinion, each of said engagement portions having a triangular shape in a plan.

5. The apparatus as claimed in claim 4, wherein:

said guide device comprises a guide groove, into which said rack is fitted, at least part of said rack, which is received in said guide groove, having a tooth profile that is formed into a block-shape so as to be guided smoothly in said guide groove.

6. The apparatus as claimed in claim 5, wherein:

said guide groove has a larger-width portion, which is larger than a height of said rack, and a smaller-width portion, which is smaller than said larger-width portion so as to ensure a proper engagement of said rack with said pinion.

7. The apparatus as claimed in claim 1, wherein:

said rack is located for movement in a direction away from a head of a player for said movable body.

8. The apparatus as claimed in claim 1, wherein:

said movable body comprises a disc.

9. An apparatus for transferring a movable body having a recess portion to be used when transferring the movable body, comprising:

a transfer lever for engaging with said recess portion to transfer said movable body, said transfer lever having a portion to be guided; and a guide device for guiding said portion to be guided of said transfer lever, said guide device being provided with a restriction member, in which movement of said portion to be guided is restricted unless said transfer lever moves by a prescribed amount of movement in a non-transferring state, and said prescribed amount of movement being determined to be smaller than an amount of movement required to cause said transfer lever to engage with said recess portion in the non-transferring state.

10. The apparatus as claimed in claim 9, wherein:

said movable body comprises a disc.

11. An apparatus for transferring a disc comprising:

a rack for transferring said disc between first and second positions, said rack being movable to effect said transfer and being flexible;

a pinion for driving said rack; and a guide device for guiding said rack for said movement thereof, said guide device having a curved portion with said rack being flexed upon movement thereof about said curved portion.

12. Transfer apparatus comprising:

a movable assembled body including a plurality of components;

a rack for transferring said movable assembled body;

a pinion for driving said rack; and a guide device for guiding said rack for movement thereof, said guide device having a curved portion, said rack being flexible for movement along said curved portion of said guide device.

* * * * *